(12) United States Patent
Jang

(10) Patent No.: US 11,489,237 B2
(45) Date of Patent: Nov. 1, 2022

(54) SECONDARY BATTERY AND ASSEMBLING METHOD THEREOF

(71) Applicant: Samsung SDI Co., Ltd., Yongin-si (KR)

(72) Inventor: Myung Jae Jang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 16/039,783

(22) Filed: Jul. 19, 2018

(65) Prior Publication Data

US 2019/0067665 A1    Feb. 28, 2019

(30) Foreign Application Priority Data

Aug. 31, 2017 (KR) .................. 10-2017-0111143

(51) Int. Cl.
*H01M 50/531* (2021.01)
*H01M 10/058* (2010.01)
(Continued)

(52) U.S. Cl.
CPC ......... *H01M 50/531* (2021.01); *H01M 4/661* (2013.01); *H01M 10/058* (2013.01);
(Continued)

(58) Field of Classification Search
CPC .. H01M 10/049; H01M 2/30; H01M 10/0436; H01M 10/046; H01M 10/0459
See application file for complete search history.

(56) References Cited

U.S. PATENT DOCUMENTS 10,312,548 B2    6/2019 Suzuki et al.
2011/0250491 A1* 10/2011 Kim .................... H01M 2/0207
429/176
(Continued)

FOREIGN PATENT DOCUMENTS

CN    106165152 A    11/2016
EP      2866279 A1    4/2015
(Continued)

OTHER PUBLICATIONS

EPO Extended Search Report dated Nov. 30, 2018, for corresponding European Patent Application No. 18190120.8 (7 pages).
(Continued)

*Primary Examiner* — Ula C Ruddock
*Assistant Examiner* — Armindo Carvalho, Jr.
(74) *Attorney, Agent, or Firm* — Lewis Roca Rothgerber Christie LLP

(57) ABSTRACT

Provided are a secondary battery and an assembling method thereof, which can ensure a battery capacity and improve welding quality of a current collector. The secondary battery includes an electrode assembly including first and second electrode tabs, a case accommodating the electrode assembly and having an opening, a cap plate coupled to the case at the opening of the case, a first current collector electrically connected to the first electrode tab of the electrode assembly, a second current collector electrically connected to the second electrode tab of the electrode assembly, and a sub-tab coupled to the first electrode tab or the second electrode tab of the electrode assembly. The sub-tab is bent along a boundary between the sub-tab and the first or second current collector and contacts an outer periphery of the first or second current collector. The sub-tab is integrally formed with the first or second current collector.

11 Claims, 12 Drawing Sheets

(51) Int. Cl.
*H01M 4/66* (2006.01)
*H01M 50/54* (2021.01)
*H01M 50/147* (2021.01)
*H01M 50/172* (2021.01)
*H01M 50/183* (2021.01)
*H01M 50/538* (2021.01)
*H01M 50/543* (2021.01)
*H01M 4/02* (2006.01)

(52) U.S. Cl.
CPC ....... *H01M 50/147* (2021.01); *H01M 50/172* (2021.01); *H01M 50/183* (2021.01); *H01M 50/538* (2021.01); *H01M 50/54* (2021.01); *H01M 50/543* (2021.01); *H01M 2004/027* (2013.01); *H01M 2004/028* (2013.01)

(56) References Cited

U.S. PATENT DOCUMENTS

| | | | |
|---|---|---|---|
| 2013/0157094 A1 | 6/2013 | Saimaru et al. | |
| 2013/0330593 A1* | 12/2013 | Kim | H01M 50/531 429/149 |
| 2014/0079971 A1* | 3/2014 | Huang | H01M 2/22 429/94 |
| 2015/0024259 A1* | 1/2015 | Lee | H01M 50/531 429/178 |
| 2015/0171384 A1 | 6/2015 | Kim | |
| 2017/0125778 A1* | 5/2017 | Iwasa | H01M 10/0431 |
| 2017/0179533 A1 | 6/2017 | Suzuki et al. | |

FOREIGN PATENT DOCUMENTS

| | | |
|---|---|---|
| JP | 2013-004177 A | 1/2013 |
| JP | 2017-50069 A | 3/2017 |
| KR | 10-1222247 | 1/2013 |
| KR | 10-1675621 | 11/2016 |
| KR | 10-2017-0003650 | 1/2017 |
| WO | WO-2015159433 A1 * | 10/2015 |
| WO | WO 2015/189677 A1 | 12/2015 |

OTHER PUBLICATIONS

Chinese Office action for Application No. 201810971835.X, dated Dec. 29, 2020, 6 pages.
Korean Office Action dated Mar. 25, 2022, issued in Korean Patent Application No. 10-2017-0111143 (5 pages).

* cited by examiner

SECONDARY BATTERY AND ASSEMBLING METHOD THEREOF

CROSS-REFERENCE TO RELATED APPLICATION

This application claims priority to and the benefit of Korean Patent Application No. 10-2017-0111143 filed on Aug. 31, 2017 in the Korean Intellectual Property Office, the contents of which in its entirety are herein incorporated by reference.

BACKGROUND

1. Field

The present invention relates to a secondary battery and an assembling method thereof, which can ensure a battery capacity and improve welding quality of a current collector.

2. Description of the Related Art

Unlike a primary battery that cannot be charged, a secondary battery can be recharged. A low-capacity secondary battery including a single battery cell is used as the power source for various portable, small-sized electronic devices, such as cellular phones and camcorders. A high-capacity secondary battery in which several tens of battery cells are connected in a battery pack is used as the power source for motor drives, such as those in hybrid electric vehicles.

Secondary batteries are manufactured in various shapes, such as a cylindrical shape and a prismatic shape. Secondary batteries are configured such that an electrode assembly formed by positive and negative electrode plates with a separator as an insulator interposed therebetween, and an electrolyte, are housed in a case, and a cap plate is coupled to the case. Positive and negative electrode terminals are connected to the electrode assembly and are exposed or are protruded to the outside through the cap assembly.

SUMMARY

Embodiments of the present invention provide a secondary battery and an assembling method thereof, which can ensure a battery capacity and improve welding quality of a current collector.

According to an aspect of the present invention, there is provided a secondary battery including an electrode assembly including a first electrode tab and a second electrode tab, a case accommodating the electrode assembly and having an opening, a cap plate coupled to the case at the opening of the case, a first current collector electrically connected to the first electrode tab of the electrode assembly, a second current collector electrically connected to the second electrode tab of the electrode assembly, and a sub-tab coupled to the first electrode tab or the second electrode tab of the electrode assembly. The sub-tab is bent along a boundary between the sub-tab and the first or second current collector. The sub-tab contacts an outer periphery of the first or second current collector. The sub-tab is integrally formed with the first or second current collector.

At least one of the first and second current collectors may include a first region and a second region inwardly recessed relative to the first region in a lengthwise direction of the cap plate.

The sub-tab may extend from an outer periphery of the second region of the first or second current collector.

An overall width, defined along the lengthwise direction of the cap plate, of the second region and a bent region of the sub-tab coupled to the first or second electrode tab may be smaller than or equal to a width of the first region.

The sub-tab may have a smaller thickness than the first or second current collector.

A planar surface of a bent region of the sub-tab may contact a planar surface of the first or second current collector.

The first or second current collector may include a bending groove formed at the boundary between the first or second current collector and the sub-tab.

The secondary battery may further include a side insulation member coupled to the first or second current collector at an outer periphery of the sub-tab.

The side insulation member may include a protrusion engaged with a hole formed in an exposed region of the first or second current collector.

According to another aspect of the present invention, there is provided a method of assembling a secondary battery, the method including preparing a sub-tab integrally formed with a current collector protruding through one plane of a cap plate, firstly bending the sub-tab around a boundary between the sub-tab and the current collector to arrange the sub-tab to be positioned substantially parallel with an electrode tab of an electrode assembly, coupling the sub-tab to the electrode tab, and secondly bending coupled portions of the sub-tab and the electrode tab around the boundary to arrange the sub-tab to be positioned at an outer periphery of the current collector.

A bent region of the sub-tab, formed by the secondly bending, may contact the outer periphery of the current collector. The coupled portions may include welded portions.

The current collector may be inwardly recessed in a lengthwise direction of the cap plate relative to the welded portions of the sub-tab and the electrode tab.

As described above, in the secondary battery according to the present invention, sub-tabs are coupled to a first current collector and a second current collector, the sub-tabs being coupled to a first electrode tab and a second electrode tab of an electrode assembly in a state in which the sub-tabs are firstly bent approximately 90 degrees and then secondly bent again approximately 90 degrees to be coupled to the first current collector and the second current collector while making contact with outer peripheries of the first and second current collectors, thereby facilitating the manufacture of the secondary battery and increasing the battery capacity by reducing an internal space loss of a battery case.

In one embodiment, a method of assembling a secondary battery includes coupling a first terminal assembly to a first electrode tab of an electrode assembly and coupling a second terminal assembly to a second electrode tab of the electrode assembly. The first terminal assembly includes a first current collector and a first sub-tab connected to the first current collector, and the second terminal assembly includes a second current collector and a second sub-tab connected to the second current collector. Coupling the first terminal assembly to the first electrode tab of the electrode assembly includes bending the first sub-tab relative to the first current collector to be substantially parallel to the first electrode tab of the electrode assembly, coupling the first electrode tab of the electrode assembly to the first sub-tab, and bending the first sub-tab and the first electrode tab relative to the first current collector to be substantially parallel to the first current collector.

Coupling the second terminal assembly to the second electrode tab of the electrode assembly may include bending the second sub-tab relative to the second current collector to be substantially parallel to the second electrode tab of the electrode assembly, coupling the second electrode tab of the electrode assembly to the second sub-tab, and bending the second sub-tab and the second electrode tab relative to the second current collector to be substantially parallel to the second current collector.

Bending the first sub-tab may include bending the first sub-tab in a first direction, and bending the second sub-tab may include bending the second sub-tab in a second direction opposite the first direction.

Coupling the first terminal assembly to the first electrode tab of the electrode assembly may include welding the first electrode tab to the first sub-tab.

Coupling the first terminal assembly to the first electrode tab of the electrode assembly may include bonding the first electrode tab to the first sub-tab with a conductive adhesive agent.

Bending the first sub-tab may include bending the first sub-tab approximately 90 degrees outward away from the second current collector.

Bending the first sub-tab and the first electrode tab may include bending the first sub-tab and the first electrode tab approximately 90 degrees toward an outer periphery of the first current collector.

DETAILED DESCRIPTION

Hereinafter, preferred embodiments of the present invention will be described in more detail with reference to the accompanying drawings, in which exemplary embodiments of the invention are shown so as to be easily realized by those skilled in the art.

A construction of a secondary battery according to an embodiment of the present invention will now be described.

Figure 1:
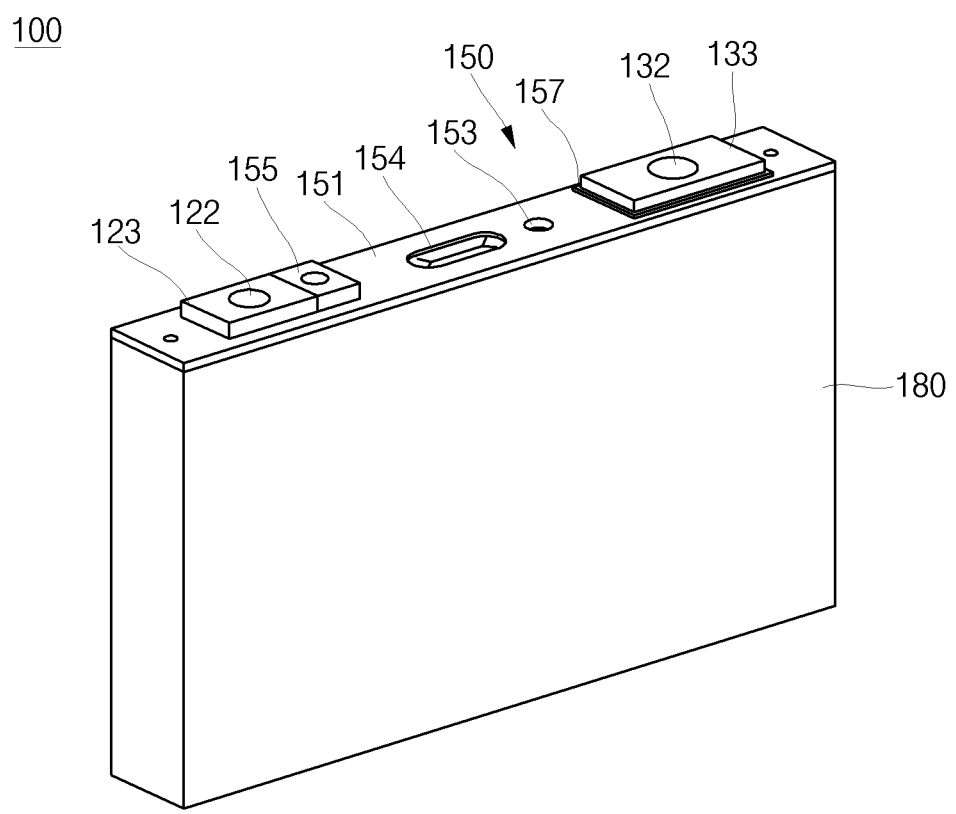
FIG. 1 is a perspective view of a secondary battery according to an embodiment of the present invention.
Figure 2:
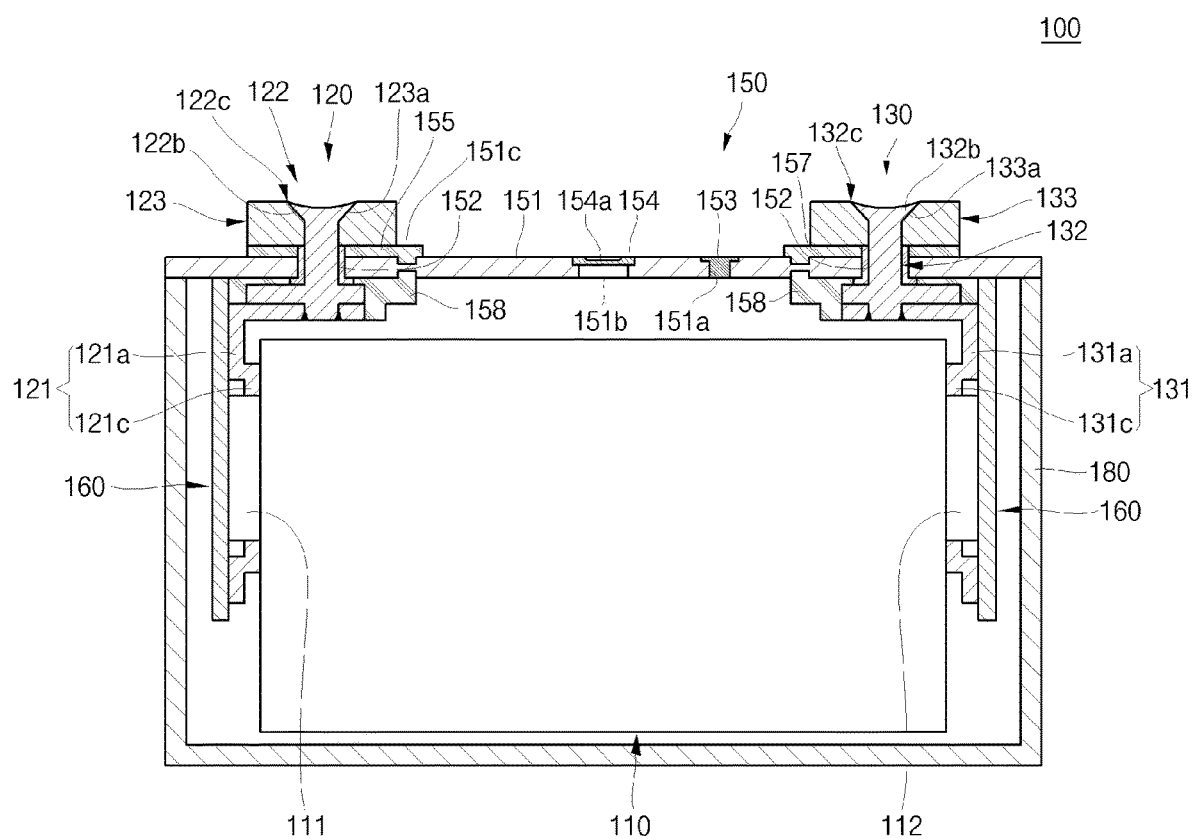
FIG. 2 is a cross-sectional view of a secondary battery according to an embodiment of the present invention.
Figure 3:
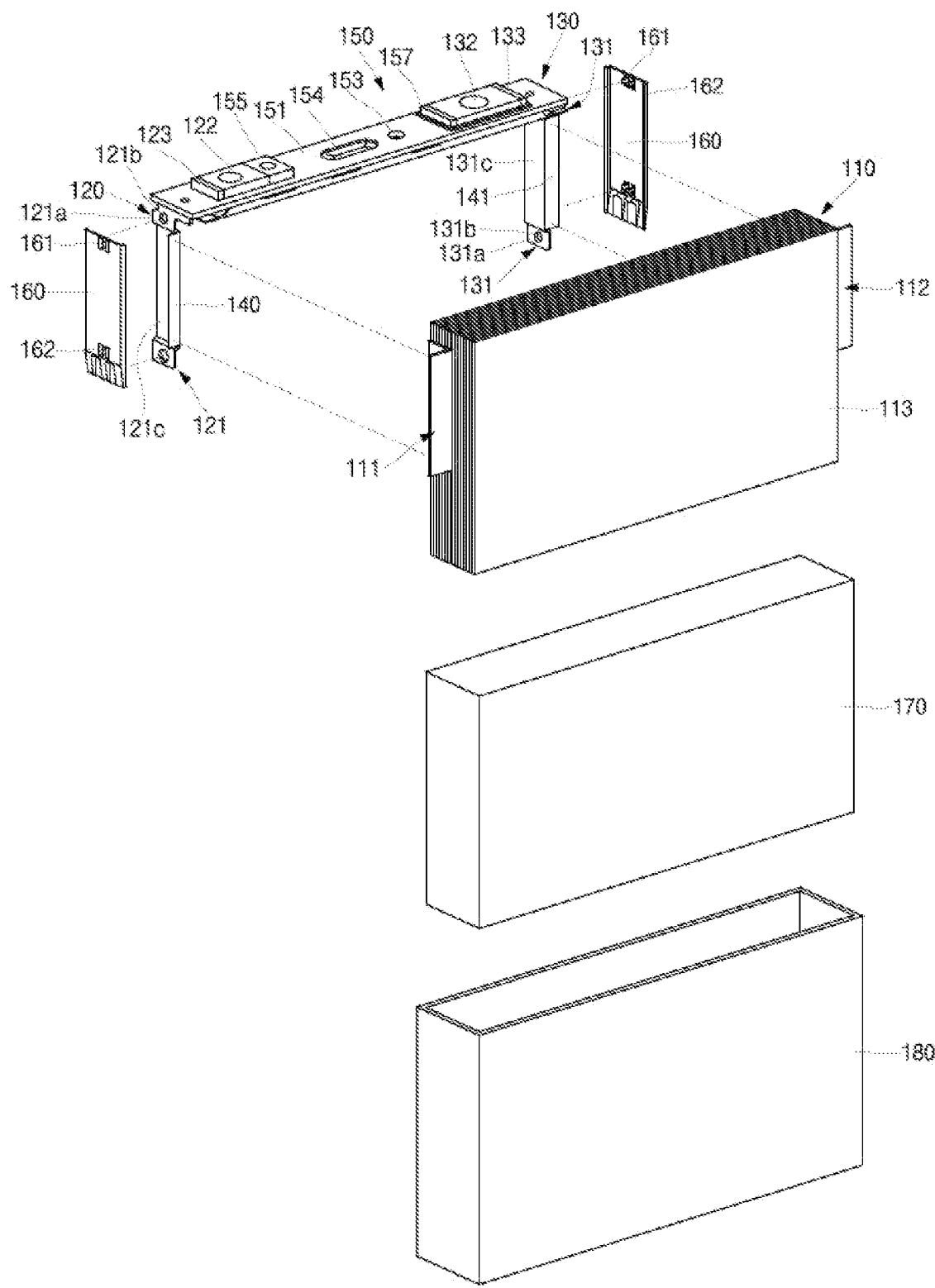
FIG. 3 is an exploded perspective view of a secondary battery according to an embodiment of the present invention.

FIG. 1 is a perspective view of a secondary battery according to an embodiment of the present invention, FIG. 2 is a cross-sectional view of a secondary battery according to an embodiment of the present invention, and FIG. 3 is an exploded perspective view of a secondary battery according to an embodiment of the present invention.

Referring to FIGS. 1 to 3, the secondary battery 100 according to an embodiment of the present invention includes an electrode assembly 110, a first terminal assembly 120, a second terminal assembly 130, a sub-tab 140, a sub-tab 141, a cap assembly 150, side insulation members 160, and a case 180. In addition, an insulation tape 170 may further be formed on an outer surface of the electrode assembly 110.

The electrode assembly 110 is formed by winding or laminating a stacked structure including a first electrode plate, a separator, and a second electrode plate, which are thin plates or layers. In one embodiment, the first electrode plate may operate as a positive electrode and the second electrode plate may operate as a negative electrode. A person of ordinary skill in the art would appreciate that polarities of the first electrode plate and the second electrode plate may be switched.

The first electrode plate is formed by coating a first electrode active material, such as a transition metal oxide, on a first electrode current collector formed of a metal foil made of aluminum. The first electrode plate includes a first electrode uncoated portion that is a region without the first electrode active material coated thereon. The first electrode uncoated portion provides a passage of the flow of current between the first electrode plate and the outside. The present disclosure is not limited to the materials of the first electrode plate listed herein.

The second electrode plate is formed by coating a second electrode active material, such as graphite or carbon, on a second electrode current collector formed of a metal foil made of copper or nickel. The second electrode plate includes a second electrode uncoated portion that is a region without the second electrode active material coated thereon. The second electrode uncoated portion provides a passage of the flow of current between the second electrode plate and the outside. The present disclosure is not limited to the materials of the second electrode plate listed herein.

The separator may be positioned between the first electrode plate and the second electrode plate to prevent a short circuit and to allow the movement of lithium ions. The separator may be formed of polyethylene, polypropylene or a composite film of polyethylene and polypropylene. The present disclosure is not limited to the materials of the separator listed herein.

A first electrode tab 111 electrically connected to the first electrode uncoated portion and a second electrode tab 112 electrically connected to the second electrode uncoated portion may be formed at opposite ends of the electrode assembly 110.

In one embodiment, the first electrode tab 111 and the second electrode tab 112 may be constructed as separate lead tabs and then be electrically connected to the first electrode uncoated portion and the second electrode uncoated portion, respectively.

The first electrode tab 111 and second electrode tab 112 may be formed by stacking a plurality of first electrode uncoated portions and a plurality of second electrode uncoated portions. The first electrode tab 111 and second electrode tab 112 may also be referred to as multi-tabs. In one embodiment, uncoated portions of the respective electrode plates are used as electrode tabs, rather than using separate electrode leads connected to the uncoated portions, and therefore electrical resistance can be reduced and charging and discharging efficiencies can be increased. In addition, the first terminal assembly 120 and the second terminal assembly 130 are electrically coupled to the first electrode tab 111 and the second electrode tab 112, respectively, thereby performing charging and discharging operations.

In addition, the electrode assembly 110 is housed in the case 180 together with an electrolyte. The electrolyte may include an organic solvent such as EC (ethylene carbonate), PC (propylene carbonate), DEC (diethyl carbonate), EMC (ethyl methyl carbonate), or DMC (dimethyl carbonate) and a lithium salt such as $LiPF_6$ or $LiBF_4$. In addition, the electrolyte may be in a liquid phase, a solid phase, or a gel phase.

The first terminal assembly 120 is made of a metal or an equivalent thereof and is electrically connected to the first electrode tab 111. The first terminal assembly 120 includes a first current collector 121, a first current collecting terminal 122 and a first terminal plate 123.

The first current collector 121 is electrically coupled to the first electrode tab 111 protruding to one side of the electrode assembly 110. In one embodiment, the first current collector 121 may be coupled to the first electrode tab 111 through the sub-tab 140. The first current collector 121 may include a first region 121a coupled to the first current collecting terminal 122 at a lower portion of the cap assembly 150 and formed in an approximately L-shaped configuration, and a second region 121c inwardly recessed from a side portion of the first region 121a. In addition, coupling holes 121b may be formed at top and bottom ends of the side portion of the first region 121a.

The second region 121c may be formed on the side portion of the first region 121a (e.g., approximately at a vertically central portion of the side portion of the first region 121a). In addition, the second region 121c is formed to be recessed relative to the first region 121a in a direction facing the electrode assembly 110. In one embodiment, as will later be described, the second region 121c is integrally formed with the sub-tab 140, and the sub-tab 140 may be bent from an outer periphery of the second region 121c after the sub-tab 140 is coupled to the first electrode tab 111 of the electrode assembly 110. Accordingly, additional components having dimensions corresponding to thicknesses of the first electrode tab 111 and the sub-tab 140 may further be coupled to the outer periphery of the second region 121c, and the overall width of the additional components may correspond to a width of the first region 121a. Therefore, the first current collector 121 including the first region 121a and the second region 121c is configured to minimize an internal space loss within a predefined area of the case 180, and therefore the battery capacity can be increased.

In addition, the coupling holes 121b are provided to be coupled to the side insulation members 160, which will subsequently be coupled to the first region 121a from the side portion of the first region 121a. In one embodiment, the coupling holes 121b are provided to be engaged with corresponding protrusions of the insulation members 160. The side insulation members 160 coupled through the coupling holes 121b may insulate the first current collector 121, the sub-tab 140, and the first electrode tab 111 of the electrode assembly 110 from the case 180.

The first current collector 121 may be made of aluminum or an aluminum alloy. However, the present disclosure is not limited to those materials of the first current collector 121 listed herein.

The first current collecting terminal 122 passes through the cap plate 151, upwardly protrudes and extends from the cap plate 151, and is electrically connected to the first current collector 121 under the cap plate 151. Like the first current collector 121, the first current collecting terminal 122 may also be made of aluminum or an aluminum alloy, but aspects of the present invention are not limited thereto. The first current collecting terminal 122 includes a flange 122a extending in a horizontal direction toward the first current collector 121, a rivet 122b upwardly protruding and coupled to the first terminal plate 123, and coupling portions 122c formed along the edge of the rivet 122b.

The flange 122a is horizontally formed on the first current collector 121. In addition, the flange 122a vertically protrudes from a region that passes through a terminal hole in the first current collector 121. In addition, welding is performed in vicinity of the terminal hole, thereby coupling the first current collecting terminal 122 to the first current collector 121.

The rivet 122b protrudes upwardly from the flange 122a. The rivet 122b is riveted in a state in which it has passed through the first terminal plate 123, to mechanically and electrically connect the first current collecting terminal 122 to the first terminal plate 123. In addition, welding is performed along the edge of the rivet 122b to form the coupling portions 122c, thereby more stably maintaining the coupling of the rivet 122b.

The first terminal plate 123 may be made of aluminum or an aluminum alloy. The first terminal plate 123 has a sloping surface 123a downwardly tapered from a top portion of the terminal body. When the rivet 122b of the first current collecting terminal 122 is riveted, the rivet 122b may be easily compressed to be deformed. As the result, a coupling area can be increased through a surface contact. Accordingly, the first terminal plate 123 can be mechanically and electrically connected to the first current collecting terminal 122.

Additionally, in one embodiment, a fastening plate 155 is formed between the first terminal plate 123 and the cap assembly 150. In addition, the first terminal plate 123 and the cap assembly 150 may have the same polarity, e.g., a first polarity, depending on the electric conductivity of the fastening plate 155. Alternatively, in one embodiment, the first terminal plate 123 and the cap assembly 150 may be electrically disconnected (e.g., electrically insulated) from each other.

The second terminal assembly 130 corresponding to the first terminal assembly 120 may have the same shape as the first terminal assembly 120. The second terminal assembly 130 is electrically connected to the electrode assembly 110. The second terminal assembly 130 may include a second current collector 131, a second current collecting terminal 132, and a second terminal plate 133.

The second current collector 131 may be made of copper or a copper alloy. However, the present disclosure is not limited to the materials of the second current collector 131 listed herein. The second current collector 131 may include a first region 131a formed in an approximately L-shaped configuration, and a second region 131c extending from the first region 131a and inwardly recessed in a direction facing the electrode assembly 110. The second region 131c is coupled to the second electrode tab 112 of the electrode assembly 110. In addition, the first region 131a of the second current collector 131 has a terminal hole to allow the second current collecting terminal 132 to be inserted into the terminal hole and to then be welded to the second current collector 131. In addition, a coupling hole 131b may be formed in the first region 131a to be coupled to the side insulation member 160.

The second current collecting terminal 132 is connected to the second current collector 131 and protrudes from an upper portion of the cap plate 151. The second current collecting terminal 132 includes a flange 132a, a rivet 132b, and coupling portions 132c. In one embodiment, the second current collecting terminal 132 has a configuration corresponding to the configuration of the first current collecting terminal 122.

The second terminal plate 133 is coupled to the second current collecting terminal 132 and has a sloping surface 133a. A coupling force between the second terminal plate 133 and the rivet 132b of the second current collecting terminal 132 can be increased by the sloping surface 133a. In one embodiment, the second terminal plate 133 is coupled to the cap plate 151 through an insulation plate 157 disposed under the second terminal plate 133. Therefore, the second terminal plate 133 having a second polarity is electrically disconnected (e.g., electrically insulated) from the cap plate 151, thereby preventing a short circuit from occurring between electrodes.

The first sub-tab 140 and the second sub-tab 141 may be integrally formed with the first current collector 121 and the second current collector 131, respectively. The first and second sub-tabs 140 and 141 may be formed to have the same material as the first current collector 121 and the second current collector 131, respectively. For example, the first sub-tab 140 coupled to, or integrally formed with, the first current collector 121 may be made of aluminum or an aluminum alloy, and the second sub-tab 141 coupled to, or integrally formed with, the second current collector 131 may be made of copper or a copper alloy. However, in one or more embodiments, the first sub-tab 140 and the second sub-tab 141 may be provided separately from the first current collector 121 and second current collector 131 and then be connected to the first current collector 121 and the second current collector 131, respectively, by welding or using a conductive adhesive agent.

The first sub-tab 140 may be integrally formed with the second region 121c of the first current collector 121 and may have a smaller thickness than the second region 121c of the first current collector 121. The first sub-tab 140 may be formed by pressing. In addition, the thickness of the first sub-tab 140 may be smaller than that of the second region 121c, thereby allowing the sub-tab 140 to be easily bent in a subsequent process. In addition, a bending groove 121d (see FIG. 5A) may further be formed at a boundary (e.g., an interface) between the second region 121c of the first current collector 121 and the first sub-tab 140 to accommodate wrinkles created by the bending operation of the first sub-tab 140, thereby facilitating the bending operation of the first sub-tab 140.

Figure 5A:
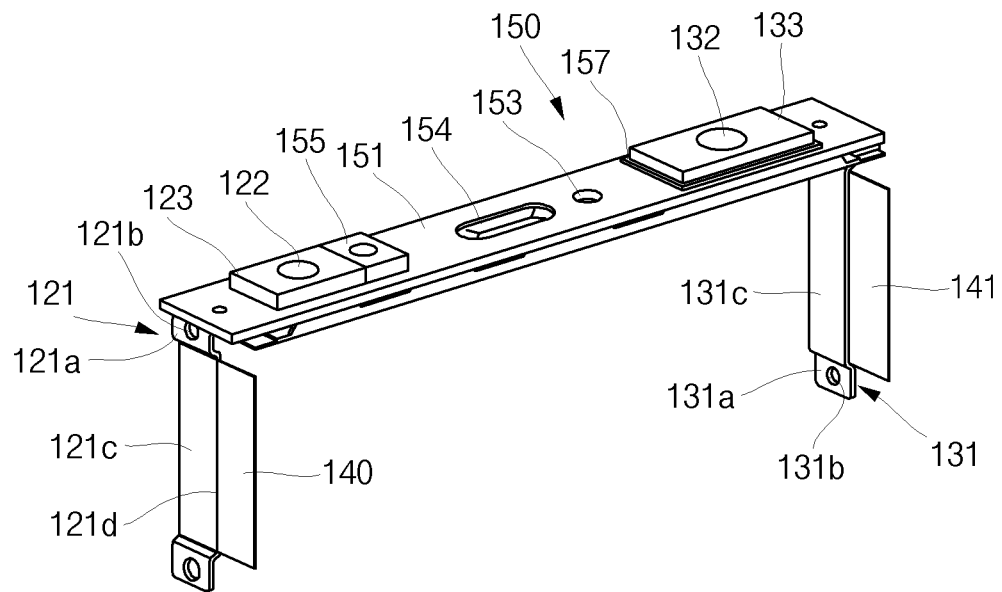
FIGS. 5A to 5H are views illustrating various processing steps of the assembling method of a secondary battery according to an embodiment of the present invention.
Figure 5B:
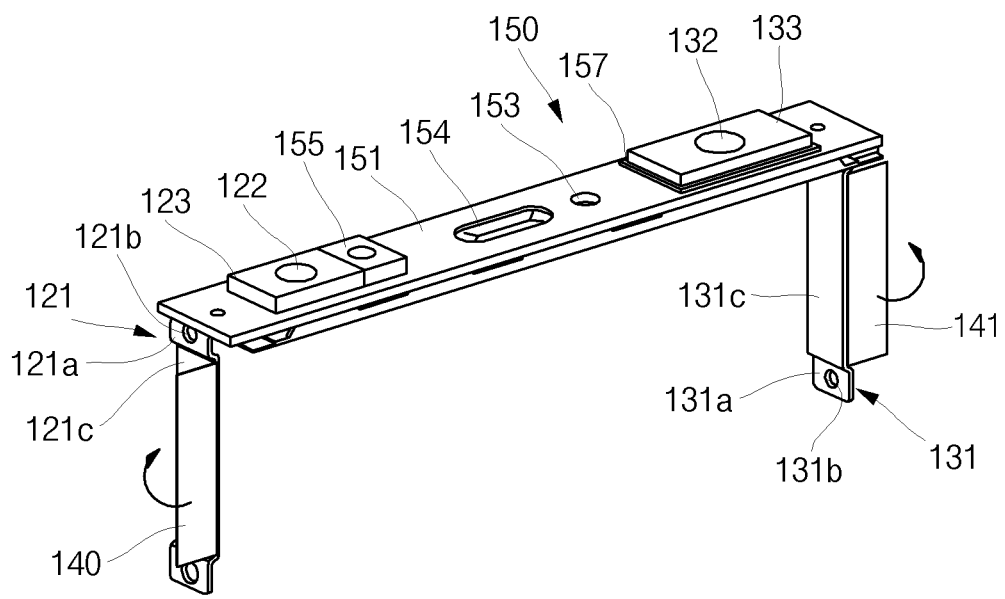

In one embodiment, as illustrated in FIG. 5B, the first sub-tab 140 may be bent approximately 90 degrees into a state in which it is positioned on an orthogonal plane or a substantially orthogonal plane with respect to the second region 121c of the first current collector 121, thereby forming a plane parallel or substantially parallel with the first electrode tab 111 of the electrode assembly 110. Thereafter, the sub-tab 140 and the first electrode tab 111 can be welded to each other, as illustrated in FIG. 5D. After the welding, a welded portion of the sub-tab 140 and the first electrode tab 111 may further be bent approximately 90 degrees such that the sub-tab 140 makes contact with an outer periphery of the second region 121c (e.g., an outer side surface of the second region 121c), as illustrated in FIG. 5E. In one embodiment, a planar surface of the sub-tab 140 is parallel or substantially parallel to a planar surface of the second region 121c of the first current collector 121 following the second bending operation. In one embodiment, the planar surface of the sub-tab 140 may contact and may be coupled to the planar surface of the second region 121c. In the illustrated embodiment, the planar surface of the second region 121c that is contacted by the planar surface of the sub-tab 140 is at an outer side surface of the second region 121c facing away from the second current collector 131.

In addition, as described above, a protrusion width of the first electrode tab 111 in the second region 121c of the first current collector 121 is smaller than that in the first region 121 of the first current collector 121, thereby preventing a capacity loss in the case 180.

The second sub-tab 141 may be integrally formed with the second region 131c of the second current collector 131 so as to correspond to the first sub-tab 140 and may have a smaller thickness than the second region 131c of the second current collector 131. In addition, a bending groove 131d (see FIG. 5A) may be formed at a boundary (e.g., an interface) between the second region 131c and the second sub-tab 141. The second sub-tab 141 may be coupled to the second electrode tab 112 of the electrode assembly 110. In one embodiment, the second sub-tab 141 may be substantially the same as the first sub-tab 140, except for the material and coupling position.

The cap assembly 150 is coupled to the case 180. In one embodiment, the cap assembly 150 includes the cap plate 151, the fastening plate 155, and the insulation plate 157. In addition, the cap assembly 150 may further include a gasket 152, a plug 153, a safety vent 154, and an insulation member 158.

The cap plate 151 seals the opening of the case 180 and may be made of the same material with the case 180. In one embodiment, the cap plate 151 may be coupled to the case 180 by laser welding. In one embodiment, the cap plate 151 may be electrically connected to the first terminal assembly 120 or may be electrically disconnected (e.g., electrically insulated) from the first terminal assembly 120.

The gasket 152 may be formed between the first current collecting terminal 122 and the cap plate 151 and between the second current collecting terminal 132 and the cap plate 151. The gasket 152 may include an insulating material and may close portions between the first current collecting terminal 122 and the cap plate 151 and between the second current collecting terminal 132 and the cap plate 151. The gasket 152 may prevent external moisture from penetrating into the secondary battery 100 and/or may prevent an electrolyte housed in the secondary battery 100 from flowing out.

The plug 153 seals an electrolyte injection hole 151a of the cap plate 151. In addition, the safety vent 154 is installed in a vent hole 151b of the cap plate 151, and a notch 154a may be formed on a top surface of the safety vent 154 to be opened at a preset pressure.

The fastening plate 155 is formed between the cap plate 151 and the first terminal plate 123. The fastening plate 155 may be made of the same material as the cap plate 151, for example, aluminum or an aluminum alloy, but aspects of the present invention are not limited thereto.

In addition, the fastening plate 155 includes a fastening protrusion, and a fastening groove 151c is formed in the cap plate 151 and located to correspond to the fastening protrusion. Therefore, when the fastening plate 155 is coupled to the cap plate 151, the fastening groove 151c is engaged with the fastening protrusion inserted therein. Therefore, the fastening plate 155 can be stably coupled to the cap plate 151, and it is possible to prevent the fastening plate 155 from moving during manufacture or use. In addition, the first current collecting terminal 122 and the gasket 152 pass through the fastening plate 155, and the first current collecting terminal 122 may be coupled to the first terminal plate 123.

The fastening plate 155 may be made of either an electrically conductive material or an electrically insulating material. When the fastening plate 155 is made of an electrically conductive material, the first terminal assembly 120 may have the same material as the cap plate 151.

Otherwise, when the fastening plate 155 is made of an electrically insulating material, the first terminal assembly 120 may be electrically disconnected (e.g., electrically insulated) from the cap plate 151.

The insulation plate 157 is formed between the second terminal plate 133 and the cap plate 151. The insulation plate 157 may have the same shape as the fastening plate 155 so as to be shaped to correspond to the fastening plate 155. However, the insulation plate 157 is made of an electrically insulating material to electrically disconnect (e.g., electrically insulate) the second terminal plate 133 having a second polarity from the cap plate 151 having a first polarity.

The insulation member 158 makes close contact (e.g., direct contact) with the cap plate 151. Moreover, the insulation member 158 may also make close contact (e.g., direct contact) with the gasket 152. The insulation member 158 tightly connect the first terminal plate 123 and the second terminal plate 133 to the cap plate 151. In one embodiment, the insulation member 158 is formed between the second current collector 131 and the cap plate 151 and between the case 180 and the second current collector 131 to prevent an unnecessary short circuit.

The side insulation member 160 may be provided as a pair and may be coupled to outer peripheries (e.g., outer side surfaces) of the first and second current collectors 121 and 131, the sub-tabs 140 and 141, and the first and second electrode tabs 111 and 112 coupled to the outer peripheries (e.g., the outer side surfaces) of the first and second current collectors 121 and 131, respectively.

The side insulation members 160 may be coupled to the coupling hole 121b and/or 131b of the first current collector 121 and/or the second current collector 131 through protrusions 161 formed at top and bottom ends of the side insulation members 160 according to the coupling position, thereby maintaining a coupling force.

In addition, the side insulation members 160 may further cover the first current collector 121 and/or the second current collector 131 through a wing portion 162 formed in a horizontally widthwise direction of each of the side insulation members 160, thereby preventing an electrical short circuit from occurring.

The side insulation members 160 coupled to the first current collector 121 and the second current collector 131 are provided to have the same configuration as each other. Therefore, the respective side insulation members 160 can be employed in the same manner, irrespective of their polarities.

The insulation tape 170 may be formed to surround the electrode assembly 110 from the outside of the side insulation member 160. The insulation tape 170 may further cover an internal structure of the case 180, thereby preventing any possible short circuit from occurring between electrodes.

The case 180 may be made of a conductive metal, such as aluminum, an aluminum alloy or nickel plated steel, and may be substantially shaped of a hexahedron having an opening through which various components, including the electrode assembly 110, the first terminal assembly 120, and the second terminal assembly 130, etc., can be inserted into the case 180. In the secondary battery 100 according to one embodiment of the present invention, since the first terminal assembly 120 is electrically connected to the cap plate 151 and the case 180, the case 180 may have a first polarity, which is the same as a polarity of the first terminal assembly 120. Accordingly, since the internal surface of the case 180 is basically insulated, the case 180 may be electrically independent of the second electrode tab 112 of the electrode assembly 110 or the second terminal assembly 130 having a second polarity, even if the second electrode tab 112 or the second terminal assembly 130 are brought into contact with the case 180 due to movement, thereby preventing occurrence of an electrical short circuit.

As described above, in the secondary battery 100 according to an embodiment of the present invention, the first and second current collectors 121 and 131 are respectively coupled to, or integrally formed with, the first and second sub-tabs 140 and 141, which are coupled to the first and second electrode tabs 111 and 112, respectively, of the electrode assembly 110 in a state in which the first and second sub-tabs 140 and 141 are firstly bent approximately 90 degrees and then secondly bent again approximately 90 degrees to be coupled to the first and second current collectors 121 and 131, respectively, while making contacts with outer peripheries (e.g., outer side surfaces) of the first and second current collectors 121 and 131, respectively, thereby easily manufacturing the secondary battery 100. In addition, an internal space loss of the case 180 can be reduced, thereby increasing the battery capacity.

Hereinafter, an assembling method of a secondary battery according to an embodiment of the present invention will be described.

Figure 4:
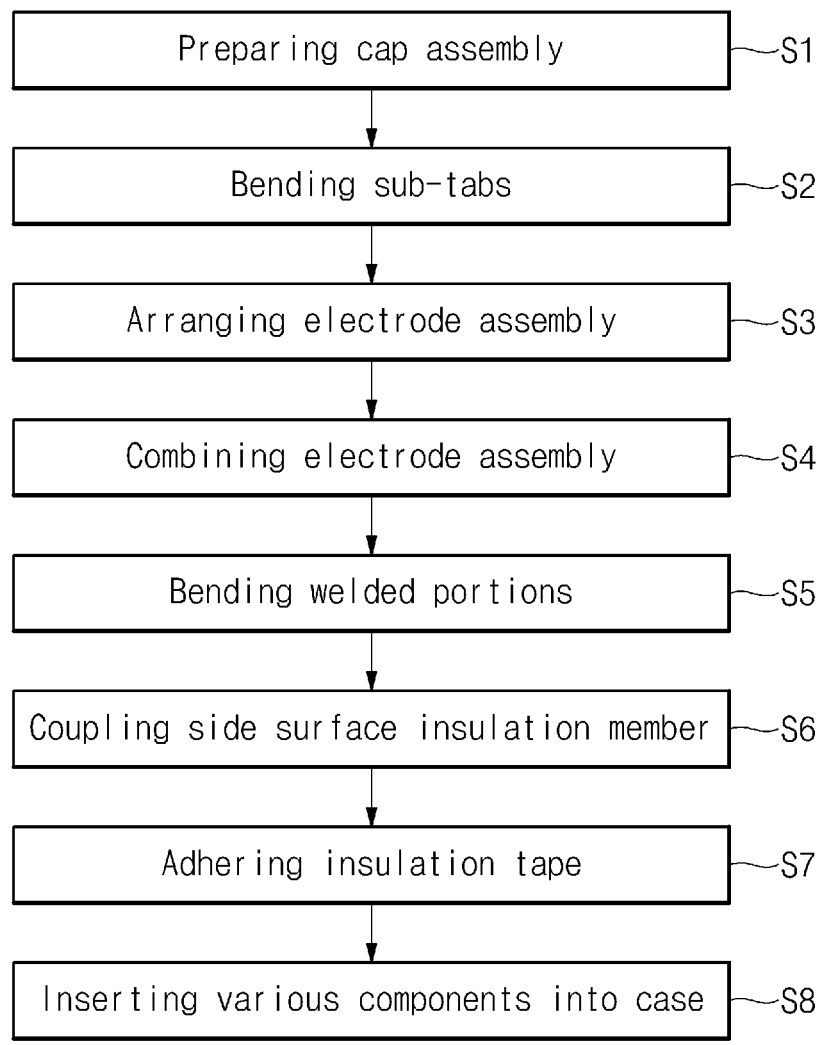
FIG. 4 is a flow chart for explaining an assembling method of a secondary battery according to an embodiment of the present invention.

FIG. 4 is a flow chart for explaining an assembling method of a secondary battery according to an embodiment of the present invention. FIGS. 5A to 5H are views illustrating various processing steps of the assembling method of a secondary battery according to an embodiment of the present invention, and FIGS. 6A to 6C are views illustrating a bending operation of a sub-tab in the secondary battery according to an embodiment of the present invention.

Referring first to FIG. 4, the assembling method of a secondary battery according to an embodiment of the present invention may include steps of preparing a cap assembly (S1), bending sub-tabs (S2), arranging an electrode assembly (S3), coupling the electrode assembly (S4) to the sub-tabs, bending welded portions (S5), coupling side surface insulation members (S6), adhering an insulation tape (S7), and inserting various components into a case (S8). Next, various processing steps of the assembling method of a secondary battery according to an embodiment of the present invention will be described with reference to FIGS. 5A to 6C.

Referring to FIGS. 4 and 5A, in the step of preparing a cap assembly (S1), a first terminal assembly 120, a second terminal assembly 130, sub-tabs 140 and 141, and a cap assembly 150 are prepared. As described above, a first current collector 121 and a second current collector 131 constituting the first terminal assembly 120 and the second terminal assembly 130 have first regions 121a and 131a and second regions 121c and 131c, respectively, and the second regions 121c and 131c may be inwardly recessed relative to the first regions 121a and 131a, respectively.

The first sub-tab 140 and the second sub-tab 141 may be made of the same materials as the first current collector 121 and the second current collector 131, respectively. For example, the first sub-tab 140 may be made of aluminum or an aluminum alloy, and the second sub-tab 141 may be made of copper or a copper alloy.

In addition, as described above, the first and second sub-tabs 140 and 141 may be integrally formed with the second regions 121c and 131c of the first and second current collectors 121 and 131, respectively. In one embodiment, the first and second sub-tabs 140 and 141 may be formed to have smaller thicknesses than the second regions 121c and 131c, respectively.

Next, referring to FIGS. 4, 5B and 6A, in the step of bending the sub-tabs (S2), the sub-tabs 140, and 141 are firstly bent approximately 90 degrees around bending grooves 121d and 131d of the respective current collectors 121 and 131. In one embodiment, the first sub-tab 140 and the second sub-tab 141 may be bent in opposite directions. In addition, as the result of the first bending task, the sub-tabs 140 and 141 are positioned in parallel or substantially in parallel with the electrode tabs 111 and 112 of the electrode assembly 110, thereby facilitating a coupling process, for example, a welding process, which will later be described.

Figure 5C:
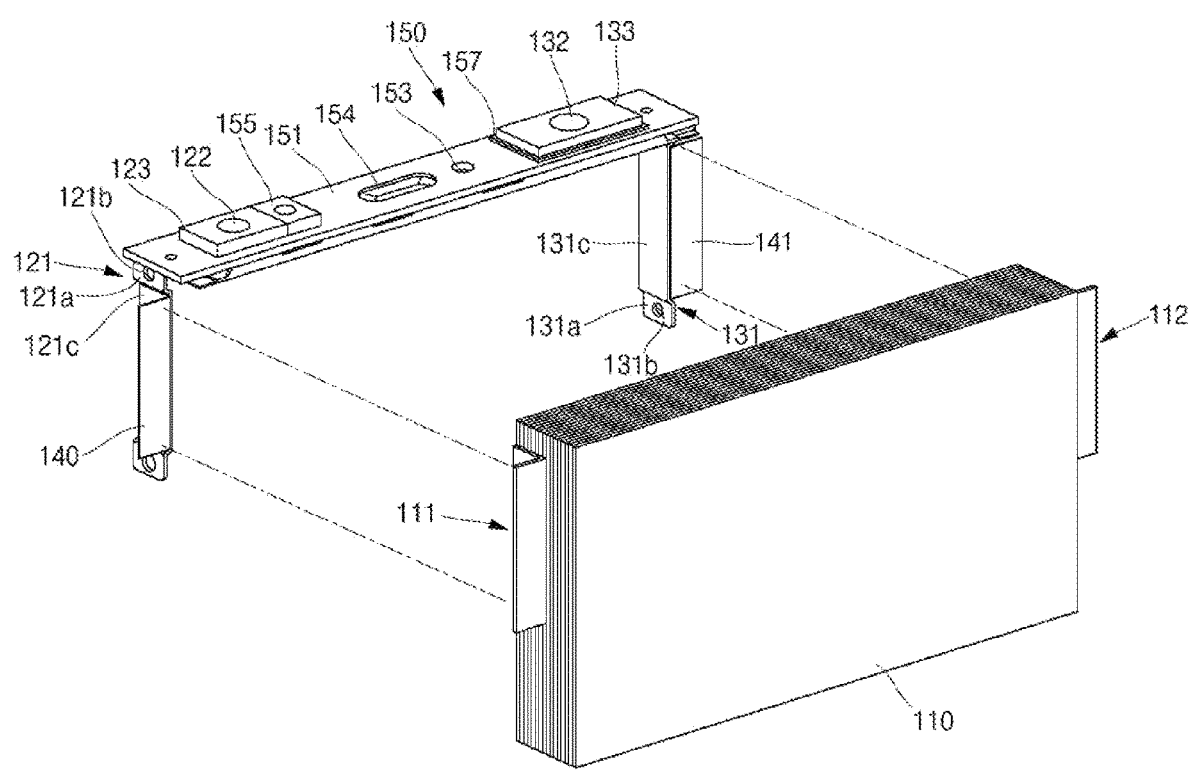
Figure 5D:
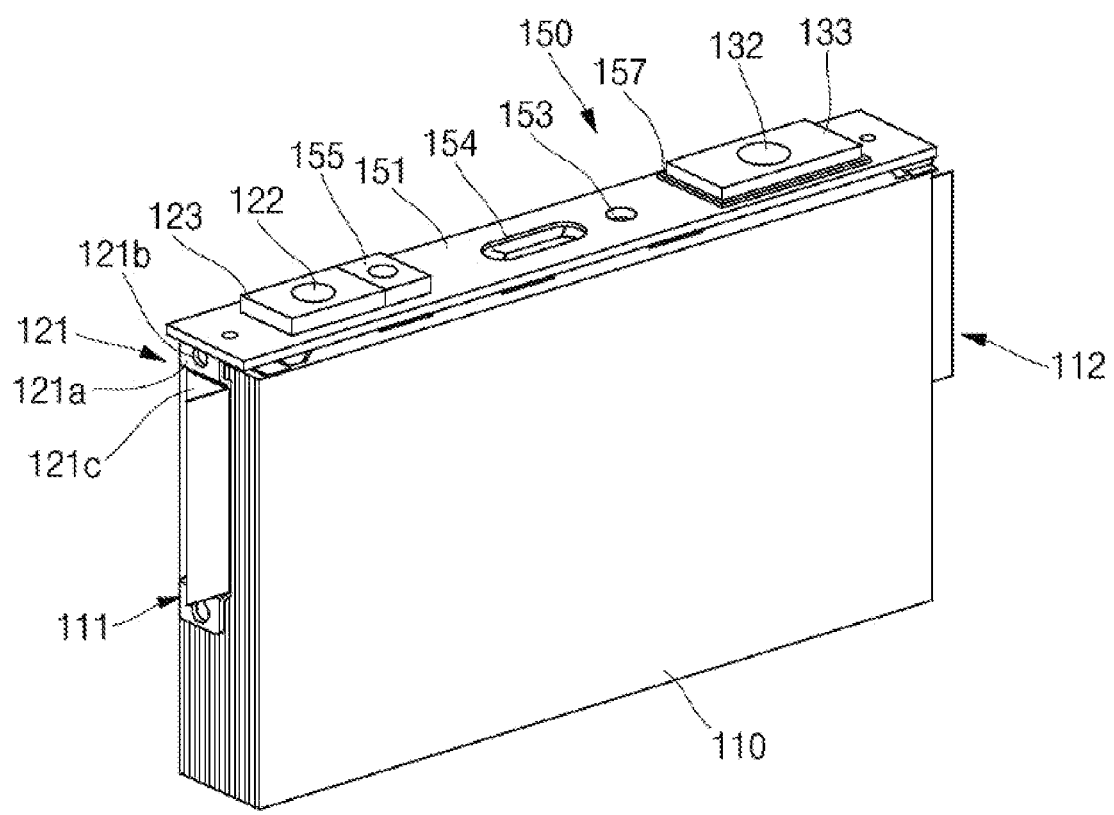
Figure 5E:
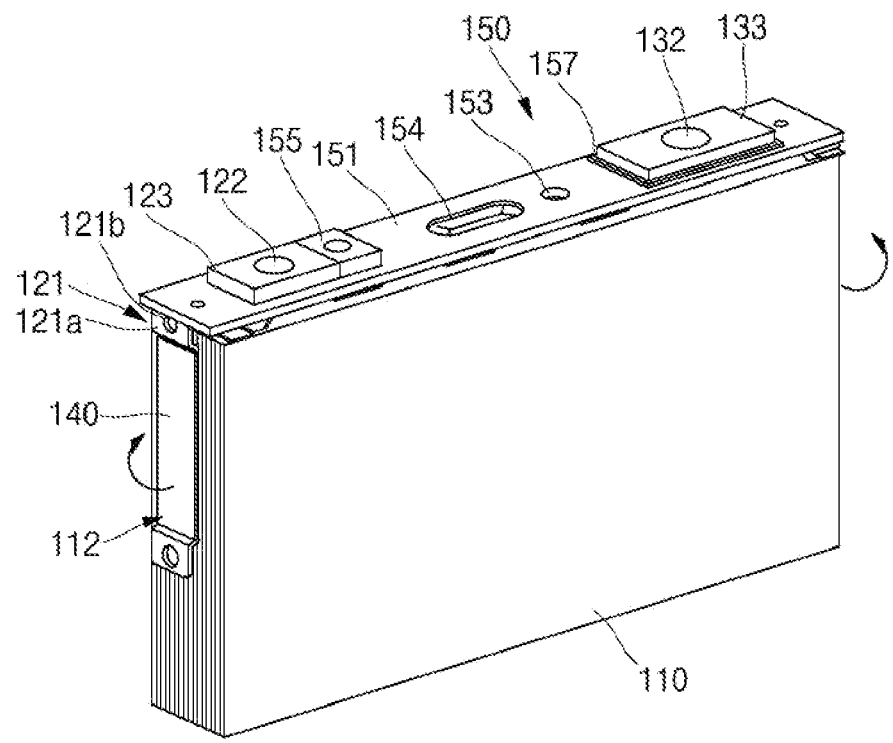
Figure 6A:
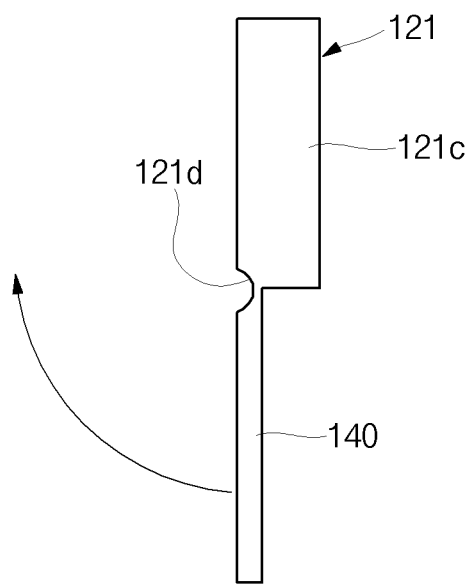
FIGS. 6A to 6C are views illustrating a bending operation of sub-tabs in the secondary battery according to an embodiment of the present invention.
Figure 6B:
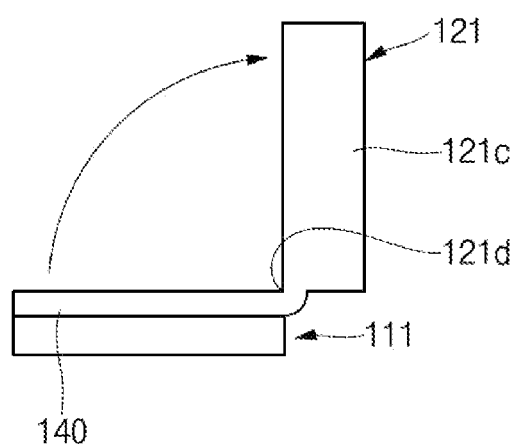
Figure 6C:
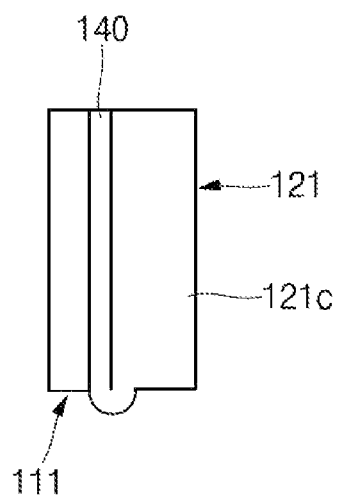

Referring to FIGS. 4, 5C and 6B, in the step of arranging the electrode assembly (S3), the electrode tabs 111 and 112 of the electrode assembly 110 are arranged to correspond to the sub-tabs 140 and 141, respectively (e.g., the electrode tabs 111 and 112 of the electrode assembly 110 are aligned with the sub-tabs 140 and 141, respectively). In one embodiment, the electrode tabs 111 and 112 may be formed in parallel or substantially in parallel with the sub-tabs 140 and 141, respectively, and then be positioned to be in surface contact with the sub-tabs 140 and 141, respectively.

Referring to FIGS. 4, 5D and 6B, in the step of coupling the electrode assembly (S4), the electrode tabs 111 and 112 are coupled to the sub-tabs 140 and 141, respectively. In one embodiment, the coupling process may be performed using, for example, welding. In some embodiments, however, another coupling process, for example, a coupling process using a conductive adhesive agent, may also be used. In addition, in the coupling process, the electrode tabs 111 and 112 are brought into surface contact with the sub-tabs 140 and 141, respectively, thereby achieving stable coupling.

Referring to FIGS. 6B and 6C together with FIGS. 4 and 5E, in the step of bending welded portions (S5), welded portions of the sub-tabs 140 and 141 and the electrode tabs 111 and 112 of the electrode assembly 110 are secondly bent approximately 90 degrees, thereby positioning the welded portions on the outer peripheries (e.g., the outer side surfaces) of the second regions 121c and 131c of the respective current collectors 121 and 131. The second bending operation allows the welded portions to be positioned at the outer peripheries (e.g., the outer side surfaces) of the second regions 121c and 131c of the respective current collectors 121 and 131.

Figure 5F:
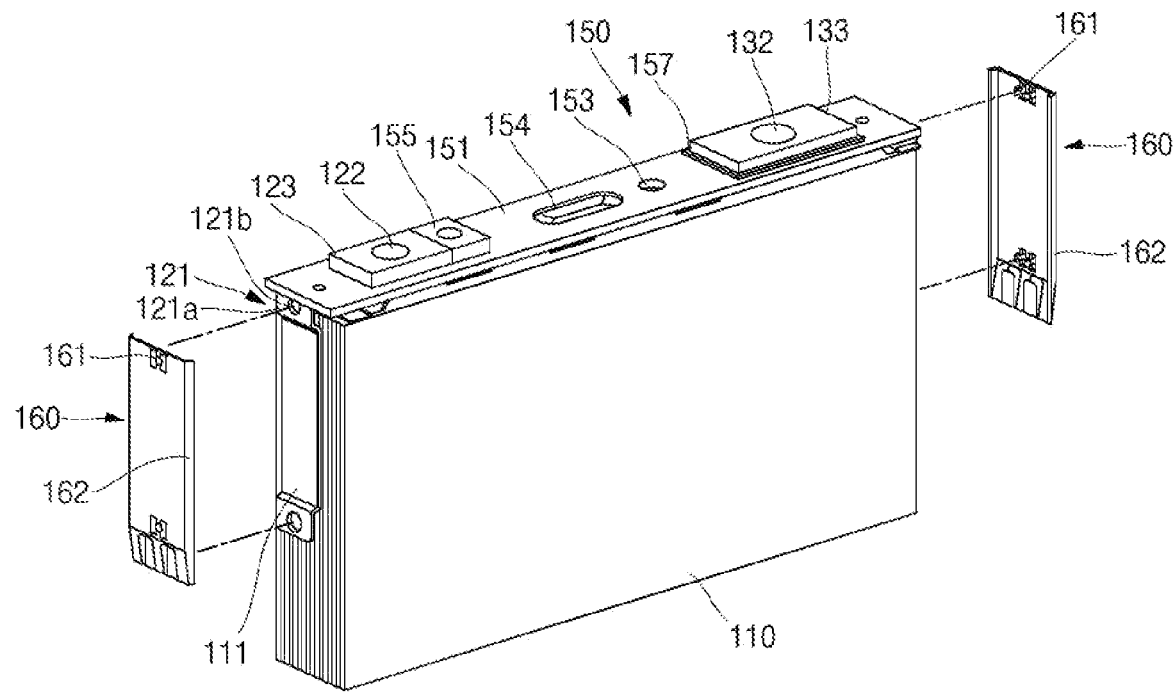

Referring to FIGS. 4 and 5F, in the step of coupling side surface insulation members (S6), the side surface insulation members 160 are coupled from an outer periphery (e.g., an outer side) of each of the current collectors 121 and 131. The side insulation member 160 may be provided as a pair of side insulation members, which may be moved from the outer periphery (e.g., the outer side) of each of the current collectors 121 and 131 to then be fastened with the coupling holes 121b and 131b of the current collectors 121 and 131, respectively. Accordingly, the side insulation members 160 insulate the sub-tabs 140 and 141 in contact with the current collectors 121 and 131 and the electrode tabs 111 and 112 of the electrode assembly 110 from the internal surface of the case 180, thereby preventing a short circuit from occurring between electrodes.

Figure 5G:
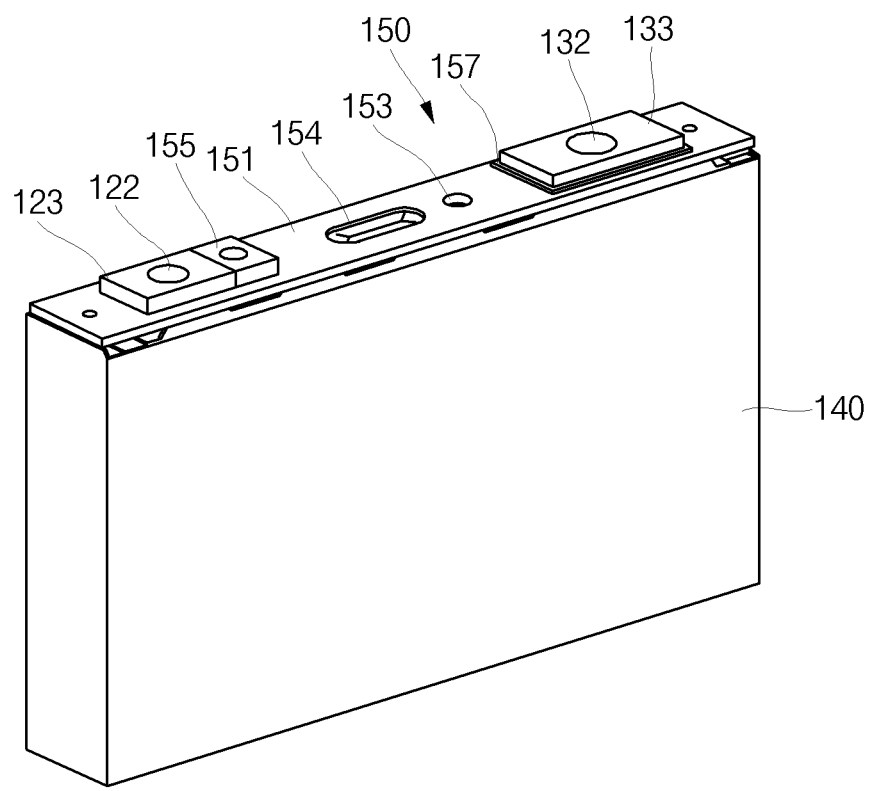

Referring to FIGS. 4 and 5G, in the step of adhering an insulation tape (S7), the side insulation members 160 and the outer surface of the electrode assembly 110 are finished using the insulation tape. Use of the insulation tape makes it possible to effectively prevent an electrical short circuit from occurring between electrodes and to maintain coupling forces of the coupled components.

Figure 5H:
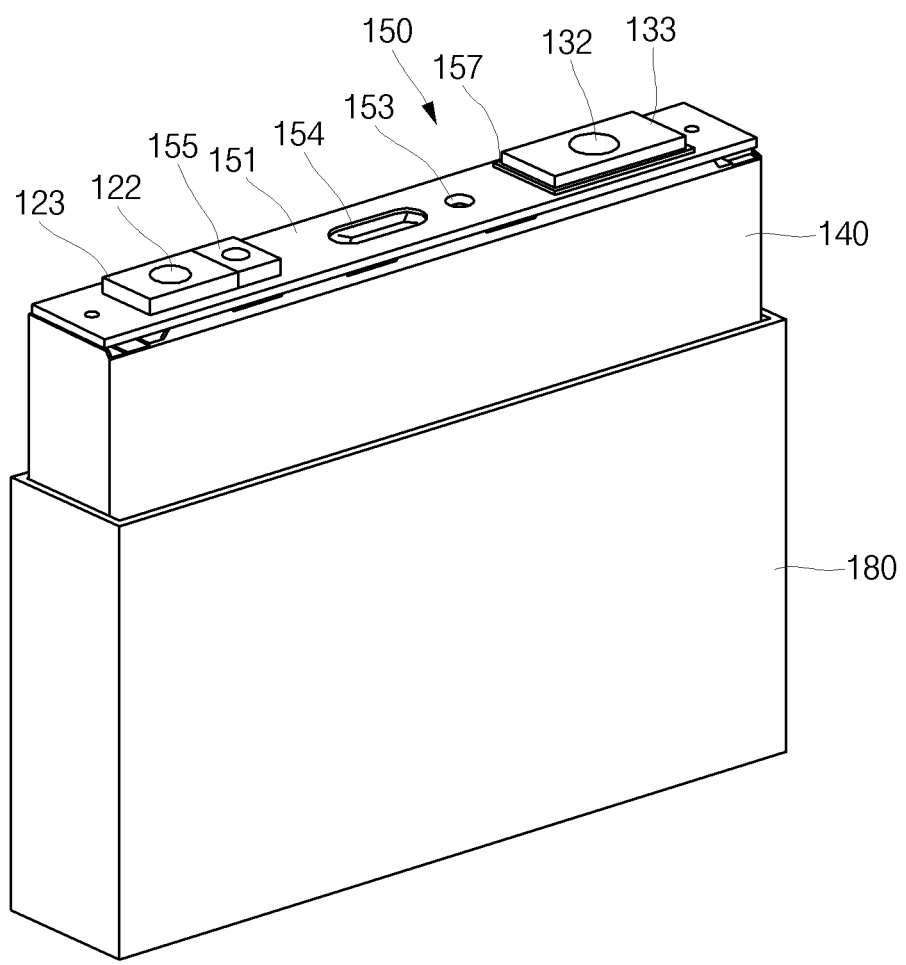

Referring to FIGS. 4 and 5H, in the step of inserting various components into the case (S8), various components, including the electrode assembly 110, the first and second terminal assemblies 120 and 130, the sub-tab 140, the sub-tab 141, the side insulation members 160, and the insulation tape 170, are inserted into the case 180 through a top opening of the case 180. As described above, insulation treatment may be performed on the internal surface of the case 180 and the top opening of the case 180 may be coupled to the cap plate 151, so that the internal structure of the case 180 can be hermetically sealed.

While the secondary battery and the assembling method thereof according to the present invention have been particularly shown and described with reference to exemplary embodiments thereof, it will be understood by those of ordinary skill in the art that various changes in form and details may be made therein without departing from the spirit and scope of the present invention as defined by the following claims.

| Description of Reference numerals | |
|---|---|
| 100: Secondary battery | 110: Electrode assembly |
| 120: First terminal assembly | 121: First current collector |
| 121a: First region | 121c: Second region |
| 121d: Bending groove | 122: First current collecting terminal |
| 123: First terminal plate | 130: Second terminal assembly |
| 131: Second current collector | |
| 131a: First region | 131c: Second region |
| 131d: Bending groove | 132: Second current collecting terminal |
| 133: Second terminal plate | 140, 141: Sub-tab |
| 150: Cap assembly | 151: Cap plate |
| 152: Gasket | 155: Fastening plate |
| 157: Insulation plate | 158: Insulation member |
| 160: Side insulation member | 170: Insulation tape |
| 180: Case | |

What is claimed is:

1. A secondary battery comprising:
   an electrode assembly including a first electrode tab and a second electrode tab;
   a case accommodating the electrode assembly, the case having an opening;
   a cap plate coupled to the case at the opening of the case;
   a first current collector electrically connected to the first electrode tab of the electrode assembly;
   a second current collector electrically connected to the second electrode tab of the electrode assembly; and
   a sub-tab coupled to one of the first and second electrode tabs of the electrode assembly, the sub-tab and the one of the first and second electrode tabs being bent along a same boundary between the sub-tab and the one of the first and second current collectors perpendicular to the cap plate,
   wherein the sub-tab is integrally formed with the one of the first and second current collectors, and
   wherein a planar surface of the sub-tab and a planar surface of the one of the first and second electrode tabs are substantially parallel to and face toward an outer planar surface of the one of the first and second current collectors perpendicular to the cap plate and extending along a side of the electrode assembly,
   wherein the one of the first and second current collectors includes a first region and a second region inwardly recessed relative to the first region by a recess in a lengthwise direction of the cap plate, wherein the planar surface of the sub-tab and the planar surface of the one of the first and second electrode tabs are accommodated in the recess, and wherein the planar surface of the one of the first and second electrode tabs is co-planar with an outer surface of the first region of the one of the first and second current collectors.

2. The secondary battery of claim 1, wherein the sub-tab extends from an outer periphery of the second region of the one of the first and second current collectors.

3. The secondary battery of claim 1, wherein an overall width, defined along the lengthwise direction of the cap plate, of the sub-tab and the one of the first and second electrode tabs is smaller than or equal to a width of the recess.

4. The secondary battery of claim 1, wherein the sub-tab has a smaller thickness than the one of the first and second current collectors.

5. The secondary battery of claim 1, wherein a planar surface of a bent region of the sub-tab contacts the outer planar surface of the one of the first and second current collectors.

6. The secondary battery of claim 1, wherein the one of the first and second current collectors includes a bending groove formed at the boundary between the one of the first and second current collectors and the sub-tab.

7. The secondary battery of claim 1, further comprising a side insulation member coupled to the one of the first and second current collectors at an outer periphery of the sub-tab.

8. The secondary battery of claim 7, wherein the side insulation member includes a protrusion engaged with a hole formed in an exposed region of the one of the first and second current collectors.

9. The secondary battery of claim 1, wherein the sub-tab directly contacts the outer planar surface of the one of the first and second current collectors.

10. The secondary battery of claim 1, wherein the boundary along which the sub-tab is bent extends in a direction perpendicular to the cap plate.

11. The secondary battery of claim 10, wherein the boundary is a vertical edge of the planar surface of the sub-tab.

* * * * *